W. A. NEELY, DEC'D.
J. S. RICHARDSON, ADMINISTRATOR.
TRIMMING DEVICE FOR SEWING MACHINES.
APPLICATION FILED OCT. 26, 1918.
1,385,329.
Patented July 19, 1921.
2 SHEETS—SHEET 1.
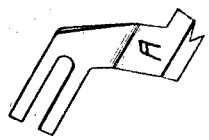
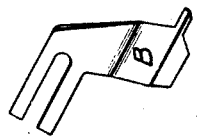
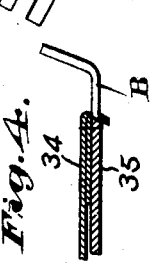
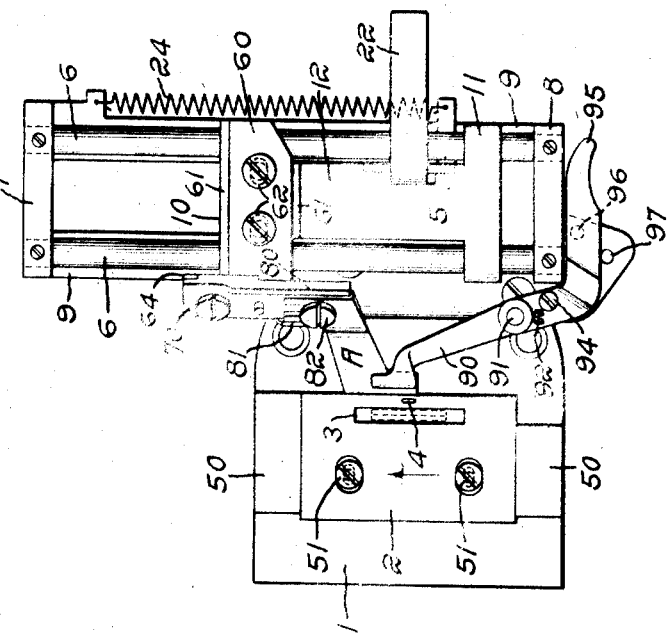
Inventor:
William A. Neely,

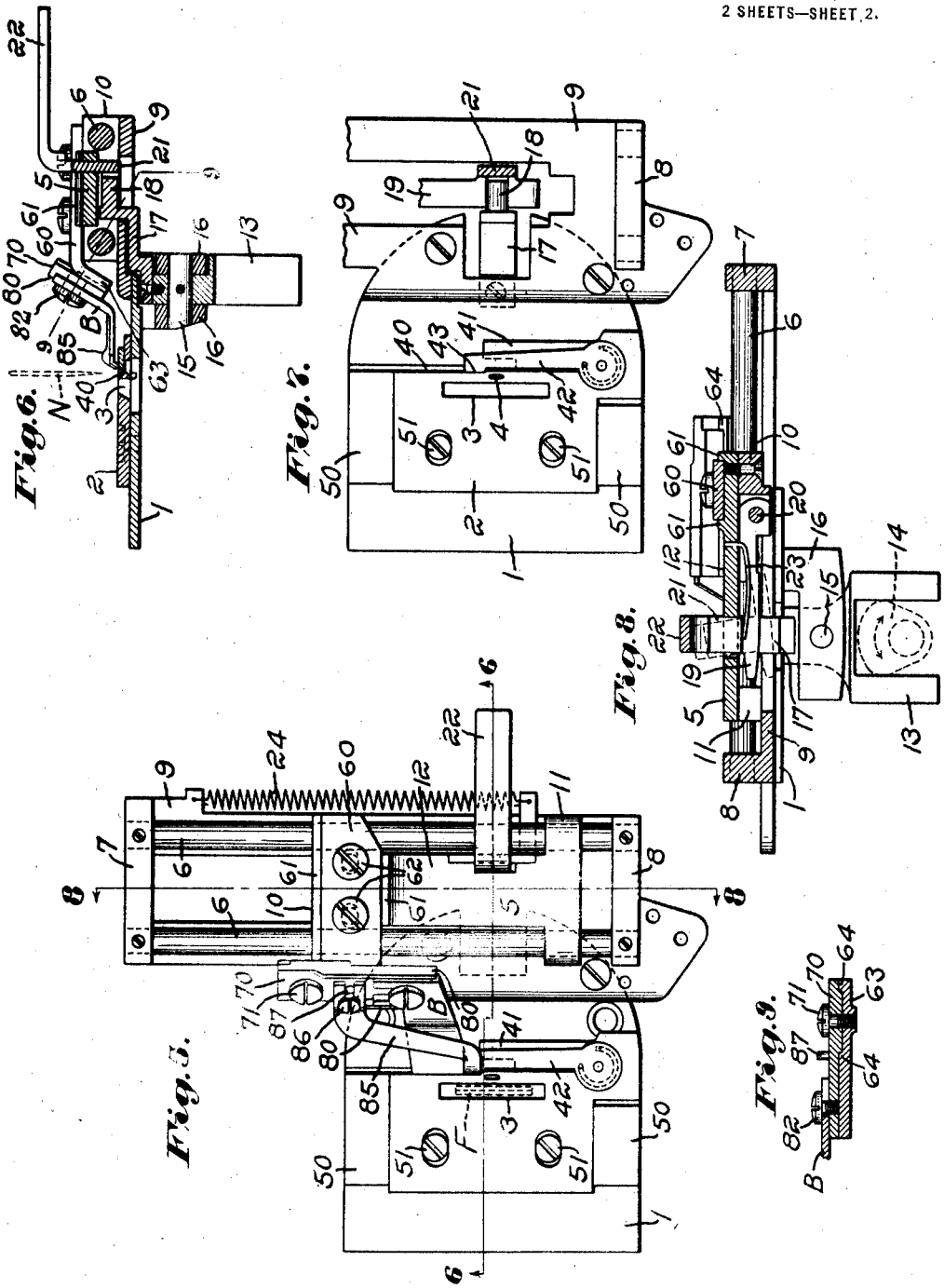

UNITED STATES PATENT OFFICE.

WILLIAM A. NEELY, OF LYNN, MASSACHUSETTS; JAS. S. RICHARDSON ADMINISTRATOR OF SAID WILLIAM A. NEELY, DECEASED.

TRIMMING DEVICE FOR SEWING-MACHINES.

1,385,329.

Specification of Letters Patent.  Patented July 19, 1921.

Application filed October 26, 1918. Serial No. 259,754.

*To all whom it may concern:*

Be it known that I, WILLIAM A. NEELY, a citizen of the United States, and a resident of Lynn, in the county of Essex and State of Massachusetts, have invented an Improvement in Trimming Devices for Sewing-Machines, of which the following description, in connection with the accompanying drawings, is a specification, like characters on the drawings representing like parts.

This invention relates to that class of sewing machine under-trimming attachments commonly known as horizontal under-edge trimming attachments wherein the lower of two pieces of material being sewed is trimmed off under and back of the edge of the upper piece. My invention has for its object useful improvements on that form of horizontal under-edge trimming attachments represented in United States Patent 619,783, dated Feb. 21, 1819, to Philip Diehl and Martin Hemleb, to which reference may be had for a more detailed understanding of the operative relationship of the elements employed. My invention provides particularly the improvements on United States patent referred to of trimming in a direct line parallel to the line of feed of the machine, mechanical line adjustment of the knife and throat plate, and the ability to accomplish various forms of trimming on any one machine with one attachment by the change of knife and throat plate. I also provide a mechanical organization insuring ease of movement and durability. A modification of my invention is shown in Figures 5, 6 and 7 of the accompanying drawings wherein the blade of the knife stands at an angle to its horizontal portion, thus providing a bevel cut which is desirable in some classes of under-edge trimming. A suitably beveled throat plate is shown; also a blade follower and edge guard.

These and other features of the invention will be best understood by reference to the following description when taken in connection with the accompanying illustration of one specific embodiment thereof, while its scope will be more particularly pointed out in the appended claims.

In the drawings:

Fig. 1 shows a plan view of a trimming attachment embodying one form of the invention and equipped with a trimming blade and throat plate suitable for carrying out the under-edge trimming method employing the perpendicular cut;

Fig. 2 is a perspective view of the trimming blade employed in the trimming device of Fig. 1;

Fig. 2ª is an enlarged cross-section of an upper with its lining stitched thereto trimmed by the blade shown in Fig. 2 with an under-edge perpendicular trimming cut;

Fig. 3 is a perspective view of a trimming blade which may be used for trimming with a beveled under-edge trimming cut in connection with the throat plate shown in Fig. 5;

Fig. 4 is an enlarged cross-section of an upper with its lining stitched thereto, the latter trimmed by the blade shown in Fig. 3;

Fig. 5 is a plan view of the trimming attachment shown in Fig. 1, but equipped with the trimming knife shown in Fig. 3 together with a throat plate and edge guide suitable for trimming with the beveled under cut;

Fig. 6 is a cross-sectional elevation of the device shown in Fig. 5 taken on the line 6—6 in Fig. 5;

Fig. 7 is a plan view of the trimming attachment shown in Fig. 5 partly broken away and with the blade carrier and carrier guides removed to show the articulated actuating connections;

Fig. 8 is a longitudinal sectional elevation taken on the line 8—8 in Fig. 5; and Fig. 9 is a detail in cross-section showing the blade carrier, taken on the line 9—9 in Fig. 6.

Referring to the drawings and to the specific embodiment of the invention therein disclosed, I have shown one form of the invention embodied for illustrative purposes in a so-called horizontal type of trimming device. This is carried by a supporting plate 1, which is arranged to be set into the work rest of the sewing machine flush with the top thereof and has adjustably supporting thereon the throat plate 2, the latter presenting a flat supporting surface or rest for the material to be stitched. The throat plate is provided with an opening 3 through which the usual feeding foot or dog (indicated at F in dotted lines in Fig. 5) of the sewing machine works, and with the needle hole 4 through which the needle (indicated by dotted lines at N in Fig. 6) passes. In the operation of the machine the upper is fed along by the movement of the feed dog on the flat top of the throat plate and in a rectilinear direction indicated by the arrow (Fig. 1). The parts of the sewing machine designed to coöperate with the elements of the trimming device are well known, and require no further description.

Herein the trimming element illustrated in Figs. 1 and 2 is in the form of the trimming blade A so mounted and actuated that it has imparted to it a rectilinear reciprocatory movement parallel to the throat plate or work rest and parallel to the direction of the feed of the material. While this movement of the trimming blade may be provided by any suitable means, herein the blade is mounted upon a carrier 5 which is slidably mounted upon guideways, the latter being in the form of guide rods 6 mounted in the end supports 7 and 8 and arranged parallel to the throat plate or work rest and the direction of feed. The end supports 7 and 8 in turn are secured to the underlying carrier plate 9 which is rigidly connected to the main supporting plate 1. The details of the construction shown in Fig. 1 will be apparent from Figs. 6, 7 and 8, wherein the device differs from that shown in Fig. 1 only in the construction of the throat plate and details of the trimming blade and edge guide.

The carrier 5 consists of end blocks 10 and 11 perforated to receive the guide rods 6 and provide a sliding support thereon, the end blocks being connected by the longitudinal connecting piece 12 which separates the end blocks by a sufficient distance to provide a rigid and accurately guided carrier structure.

To impart reciprocatory movement to the carrier and its trimming blade, the device is provided with a member which may be of any suitable construction but herein is in the form of a lever having the depending yoke 13 (Figs. 6 and 8) which is adapted to embrace and have engaging contact with an actuating member on the sewing machine such as the oscillatory cam 14 customarily provided on sewing machines of this class. In the specific form of the invention shown, the actuating yoke 13 is pivoted at 15 between the arms of a depending bracket 16 secured to the under side of the supporting plate 1. Above its pivot point the actuating lever is provided (Figs. 6 and 7) with an extension 17 which projects laterally and thence upward beneath the carrier block member 12 and is provided with a laterally extending pin 18 adapted to engage and reciprocate the carrier block.

To reciprocatively move the carrier through the oscillation of the pin 18, the latter (Figs. 6, 7 and 8) normally fits within a recess formed in the latch piece 19, which latter is secured to the under side of the carrier so that the oscillatory movement of the yoke lever and its pin 18 are converted into a rectilinear reciprocatory movement of the carrier block and its trimming blade.

The latch piece 19 (Fig. 8) is pivoted to the carrier block at 20, but is provided at its free end with an upright arm 21 projecting through a slot in the carrier member 12 and terminating in a horizontal finger piece or handle 22 at a height and position wherein it may be easily and quickly moved by the operator. The latch piece is normally held up close against the under side of the carrier piece 12 with its recess embracing the oscillatory pin 18 by means of the spring 23, one end of which is secured to the carrier member 12 while the other end presses upward against a shoulder on the upright arm 21. When the recess in the latch piece engages the oscillatory pin, therefore, the spring 22 holds the latch piece up and preserves such engagement.

When the operative, however, desires to disconnect the trimming attachment from the actuator and throw it out of operation, by depressing the finger piece 21 and forcing the carrier in the direction of feed (or to the right as viewed in Fig. 8) the latch may be depressed and disengaged from the pin 18 and the entire carrier block with its trimming blade moved to the end of the guide rod 6 and disengaged entirely from the oscillatory actuator. In the form of the invention herein shown this disengagement of the trimming device may be secured by a mere depression of the finger piece 21, the carrier being drawn to the end of the guide rods by a spring 24, one end of which is secured to the plate 9 and the other end to the carrier block. Under these conditions the machine may continue its operation, but the only part of the trimming attachment which continues its movement is the oscillatory actuating yoke-lever.

When it is desired to reëgage the trimming element with its actuator, the operator, by means of the finger piece, draws the carrier block forward on the guide rods (to the left as viewed in Fig. 8), at the same time depressing the finger piece slightly. This causes the beveled tip of the latch member 19 to pass under the oscillatory pin, the latch piece snapping up to embrace the pin when the finger piece is released.

By imparting a reciprocatory movement to the carrier and blade in a rectilinear line parallel to the feed of the machine, there is provided a progressive shear cut between the trimming element and the trimming surface in line with the feed of the machine. As compared with a radial or oscillatory movement of the cutting blade in common use, this produces a smoother and more even cut and avoids the frequent breakage of blades caused by the lateral strain in cutting heavy material which is incidental to a radial movement where the blade departs from a direct line cut while the material is being firmly held by the needle and pressure foot of the sewing machine.

In Fig. 2ª there is shown the results of trimming by the under-edge method employing the perpendicular cut, the beaded upper being represented at 30 and the lining with its trimmed off edge at 31. One form of blade which is suitable for trimming with this method is illustrated in Fig. 2 and, as already described, is shown applied to the trimming device in Fig. 1.

For under-edge trimming where the lining is trimmed with a beveled cut, a trimming element such as the blade B shown in Fig. 3 may be utilized, the trimmed stock being represented in Fig. 4. The beaded upper is there shown at 34 and the beveled trimmed lining at 35.

In connection with the beveled trimming blade B an appropriately shaped throat plate such as is shown in Figs. 5, 6 and 7 is preferably employed. This has a beveled edge 40 against which the beveled knife blade B slides and extending for the length of the stroke of the knife blade part way the length of the throat plate. The throat plate is provided with a slightly depressed extension shelf 41, on which there is pivoted the spring-pressed supporting finger 42 having the beveled tip 43 which is yieldably pressed against the end of the beveled edge of the throat plate, and, while serving as a support for the severed strip of the lining, yields to permit the movement of the blade along the beveled edge of the throat.

In the described embodiment of the invention, improved means are provided for the adjustment of the throat plate edge and needle hole relative to the needle for determining the distance of cut from the stitches, also for the adjustment of the blade in proximity to the edge of the throat plate, the raising and lowering of the blade relative to the various thicknesses of material, and compensation for the wear of the blade.

It may be desirable under some conditions, as when making the beveled under-cut, to avoid trimming close to the needle. With the described movement of the trimming blade, however, the region in which shearing takes place may be regulated by the length or adjustment of the blade so that means are provided through this arrangement, as illustrated by the device shown in Fig. 5, whereby a horizontal progressive shear cut may be effected wholly at the rear of the machine needle.

Referring first to the throat plate, means are provided whereby the latter may be adjusted laterally with accuracy to secure any desired relation of the needle hole to the needle. While this may be secured in various ways, herein the throat plate 2 is movable between accurately shaped guideways formed by guides 50 formed by raised portions on the supporting plate 1. The throat plate is secured to the supporting plate by binding screws 51, which pass through longitudinally slotted holes so that by loosening the screws the plate may be adjusted laterally with relation to the needle, the guideways maintaining at all times an accurate alinement and exact parallelism between the guide rods and the edge of the throat plate.

To quickly and accurately adjust the blade with relation to the edge of the throat plate and the needle hole, the blade is secured to the carrier 5 by suitable means such as an intermediate carrier block 60, the latter being held between raised guideways 61 on the carrier 5, and secured to the latter by means of binding screws 62 passing through slotted holes in the intermediate carrier 60. This provides means whereby the blade may be adjusted laterally with precision at exactly right angles to the line of its reciprocatory movement.

To adjustably raise and lower the blade the intermediate carrier 60 has a downturned overhanging end 63 which in turn forms guideways 64 for an adjustable plate 70 held in position on the guideways of the intermediate carrier by a binding screw 71 passing through a slotted hole. This provides means for quickly and accurately raising and lowering the blade relative to the various thicknesses of material.

To provide means for quickly and accurately adjusting the blade backward and forward relative to the needle as required in practice and to compensate for the wear of the blade, the latter has its rear end slotted as shown in Figs. 2, 3 and 4, the two bifurcated portions resting between raised guideways 80 and 81 on the plate 70 and adjustably held in position thereon by the binding screw 82.

In the device illustrated in Fig. 5, I have shown a flexible or resilient edge guard 85 of usual construction secured to the plate 70 by means of the binding screw 86 and pin 87. In Fig. 1, however, I have shown an edge guide 90 which is rigid but adjustable. The latter is fixedly secured to an upright pin 91, on which it may be adjusted by means of the set screw 92, either for height to adapt it to various thicknesses of the material or laterally to adapt it to varying distances from the needle. The supporting pin 91 for the edge guide is carried upon one arm 93 of an underlying lever which is pivoted to the supporting plate at 94, the other end of the lever terminating in a finger piece 95. The latter is normally held in the position represented in Fig. 1 by means of a pin 96 which seats in a hole or depression in the underlying supporting plate. The lever is resiliently formed, however, so that by lifting the finger piece the pin may be withdrawn from its recess and the lever swung over until the pin snaps into an adjoining hole 96, in which position the head of the edge guide is thrown back away from the needle and out of action. While the edge guide is rigid, therefore, it is capable of adjustment both vertically and laterally and may be thrown out of action when required.

While I have herein shown and described for illustrative purposes one specific form of the invention embodied in a horizontal type of trimming device, it is to be understood that the same is not limited to the details of construction or relative arrangement of parts or to the specific type of trimming device herein shown, but that extensive modifications may be made therefrom without departing from the spirit of the invention.

I claim:

1. In a trimming device for sewing machines, the combination with a throat plate having a needle hole, a horizontal under edge trimming blade movable in a rectilinear line parallel to the feed of the machine and guide ways in which the throat plate is adjustable laterally relatively to the needle hole.

2. In a trimming device for sewing machines, the combination with a horizontal under edge trimming blade, a throat plate having an edge coöperating with the trimming blade and a blade carrier having a movement in line with the feed of the machine and parallel to the face of the throat plate and having also guide ways in which the blade is adjustable laterally toward or from the said edge of the throat plate.

3. In a trimming device for sewing machines, the combination with a work rest, a horizontal under edge trimming blade, a blade carrier having a rectilinear movement parallel to the line of feed of the machine, said carrier having guiding means on which the blade is adjustable up or down to accommodate it to different thicknesses of material to be trimmed.

4. In a trimming device for sewing machines, the combination with a work rest, a horizontal under edge trimming blade, a blade carrier having a rectilinear movement and parallel to the line of feed of the machine, said carrier having guiding means for adjusting the blade in line with the feed of the machine to compensate for the wear of the blade.

In testimony whereof, I have signed my name to this specification.

WILLIAM A. NEELY.